(12) United States Patent
Shiba et al.

(10) Patent No.: US 6,274,997 B1
(45) Date of Patent: Aug. 14, 2001

(54) SYNCHRONOUS CONTROL DEVICE

(75) Inventors: Noriyuki Shiba, Tokyo; Ikuo Kotani, Ebina, both of (JP)

(73) Assignee: Kabushiki Kaisha Tokyo Kikai Seisakusho (JP)

( * ) Notice: Subject to any disclaimer, the term of this patent is extended or adjusted under 35 U.S.C. 154(b) by 0 days.

(21) Appl. No.: 09/511,348

(22) Filed: Feb. 23, 2000

(30) Foreign Application Priority Data

Feb. 25, 1999 (JP) .................................................. 11/048621

(51) Int. Cl.[7] ....................................................... H02P 1/46
(52) U.S. Cl. ........................... 318/700; 318/567; 318/569; 318/600; 318/717; 318/723
(58) Field of Search .................................... 318/700, 606, 318/567, 569, 600, 717, 723; 388/805, 907.5

(56) References Cited

U.S. PATENT DOCUMENTS 3,974,428 * 8/1976 Hafle ..................................... 318/610
5,541,781 * 7/1996 Barr et al. ............................ 360/14.3

FOREIGN PATENT DOCUMENTS

| 56-081093 | 7/1981 | (JP) . |
| 62-122987 | 6/1987 | (JP) . |
| 03245790 | 11/1991 | (JP) . |
| 09248978 | 9/1997 | (JP) . |

* cited by examiner

Primary Examiner—Karen Masih

(74) Attorney, Agent, or Firm—Bierman, Muserlian and Lucas

(57) ABSTRACT

An object of the present invention is realizing a highly accurate synchronous control device which does not cause time lag by detecting the rotational frequency and phase simultaneously perpetually by same signal in the synchronous control of plural electric motors. The synchronous control device synchronizes accurately rotational frequency and rotation phase of an electric motor or a machine axis driven by the electric motor. A master section outputs phase signals or frequency signals based on rotational frequency reference.

On the other hand, a slave section detects master rotational frequency setting signals and master phase setting signals simultaneously and perpetually by using the phase signals or frequency signals from the master section, and detects rotational frequency feedback signals and phase feedback signals simultaneously and perpetually based on output of a rotary encoder attached to an electric motor or connected to an machine axis driven by the electric motor, then detects phase deviation perpetually out of the master phase setting signals and the phase feedback signals.

The electric motor of the slave section or the machine axis driven thereby is synchronously controlled based on the phase deviation, said master rotational frequency setting signals and said rotational frequency feedback signals.

Also, the master section may provide a control device for controlling the electric motor, and a means for sending frequency signals outputted from a rotary encoder attached to the electric motor or a rotary encoder connected to an machine axis driven by the electric motor to the slave section.

3 Claims, 8 Drawing Sheets

SYNCHRONOUS CONTROL DEVICE

BACKGROUND OF THE INVENTION

1. Field of the Invention

The present invention relates to a synchronous control device for electric motors and machine axes driven by electric motors in a conveying device.

2. Description of the Related Art

When synchronizing a plurality of electric motors or machine axes driven by electric motors to keep the electrical phases thereof in the same relation to each other, a common rotational frequency reference is set, and correction of the synchronous control is made by using a deviation between the frequency signal corresponding to the rotational frequency reference and the frequency signal of a rotary encoder of the electric motor.

In the prior art, the signal formation and detecting method of the main control loop for the rotational frequency reference is independent from the correction loop for frequency deviation, so that a time lag between them occurs and highly accurate synchronous control is very difficult.

FIG. 7 shows a conventional synchronous control device for a plurality of electric motors, for example, two electric motors.

In FIG. 7, Cm is a concentrated control device of a master section. In the concentrated control device Cm, Sm is a rotational frequency setting device, Tm is an communication interface which sends out the rotational frequency setting signals from the rotational frequency setting device. The rotational frequency setting signals are sent to a slave section through a communication line 1.

Fm is a frequency signal generator which inputs the rotational frequency setting signals output from the rotational frequency setting device Sm and which generates frequency signals proportional to the rotational frequency setting input. The output from Fm is sent to the slave section through a signal line 2. Now, in the following explanation, a line which transmits signals transformed to the serial signals from the digital signals is called a communication line, and a line which sends pulse signals as they are is called a signal line.

Further, Cs1 and Cs2 are slave section control devices, As1 and As2 are driving devices of electric motors of the slave section, Ds1 and Ds2 are electric motors in the slave section, Rs1 and Rs2 are rotary encoders added to the electric motors, Gs1 and Gs2 are transmission devices, Ks1, Ks2 are machine axes driven by electric motors of the slave section.

The slave section control device Cs1 and Cs2 are composed of the same components, so that, in the following explanation, only the slave section control device Cs1 is explained, but the components of the slave section control device Cs2 are similarly numbered.

In FIG. 7, 11 is a communication interface, which receives the rotational frequency setting signals output from the communication interface Tm in the master section, and stores them into the rotational frequency reference storing means 12 as the master rotational frequency setting signals. 15 is a rotational frequency feedback detector, which detects feedback rotational frequency from the frequency signals output from the rotary encoder Rs1 in the slave.

13 is a frequency deviation counter, which up-counts the frequency signals from the frequency generator Fm in the master section, and detects the deviation by down-counting the frequency signals from the rotary encoder Rs1 in the slave section.

These outputs of the frequency deviation counter 13 are added or substituted to the master rotational frequency setting signals output from the rotational frequency reference storing means 12 through a proportional integration amplifier 14 (in the following, referred to PI) as correction signals, further calculated with the rotational frequency feedback signals output from the rotational frequency feedback detector 15 and sent to the driving device As1.

That is, the master rotational frequency setting signals are corrected based on the output of the frequency deviation counter 13 (frequency deviation), and rotational frequency and phase of the electric motor Ds1, Ds2 in the slave section Cs1, Cs2 are controlled based on the deviation between said corrected rotational frequency setting signals and rotational frequency feedback signals.

In the conventional method, the signal formation and the detecting method of the main control loop of the rotational frequency reference and the correction loop of the frequency deviation in the slave section are different, so that the time lag is inevitable and a highly accurate synchronous control is very difficult.

These are explained in FIG. 8 further.

In FIG. 8, 1 is a reference signal which is output from the communication interface Tm in the concentrated control device of the master section Cm in FIG. 7, received and detected in the communication interface 11 set in the rotational frequency slave section control device, and stored in the rotational frequency reference storing means 12. Further in FIG. 8, 2 is a frequency signal which is sent from the frequency generator Fm in the master section Cm in FIG. 7, and input to the frequency deviation counter 13 set in the slave section.

As shown in FIG. 8, the reference signal 1 and the frequency signal 2 are different in the signal form and the detecting method is also different, so that the time lag occurs although they should be overlapped in essence.

Moreover, in FIG. 8, times t1, t2, t3 . . . show timings to implement synchronous control processing in the slave section. At time t2, corresponding to a point A of the reference signal 1, the frequency signal 2 should agree with A'. However, the frequency signal 2 is controlled by using the value at B point, because of the time lag caused by the difference of a generated method and a transmission path between reference signal 1 and frequency signal 2. That is, ΔF in FIG. 8 is occurred in the synchronous loop as an error in the synchronous control, so that a highly accurate synchronous control is difficult.

SUMMARY OF THE INVENTION

This invention is developed for resolving the problem. The present invention provides an accurate synchronous control without causing the time lag by detecting the rotational frequency and phase simultaneously and perpetually with the same signals in the synchronous control of a plurality of electric motors.

A master section outputs phase signals or frequency signals based on rotational frequency reference. A slave section detects master rotational frequency setting signals and master phase setting signals simultaneously and perpetually by using the phase signals or frequency signals from the master section, and detects rotational frequency feedback signals and phase feedback signals simultaneously and perpetually based on output of a rotary encoder attached to an electric motor or connected to an machine axis driven by the electric motor, then detects phase deviation perpetually out of the master phase setting signals and the phase feedback signals.

The electric motor of the slave section or the machine axis driven thereby is synchronously controlled based on the phase deviation, said master rotational frequency setting signals and said rotational frequency feedback signals.

Also, the master section may provide a control device for controlling the electric motor, and a means for sending frequency signals outputted from a rotary encoder attached to the electric motor or a rotary encoder connected to an machine axis driven by the electric motor to the slave section, according to the present invention.

The feature and advantage of the present invention will be apparent from the following mode for implementing the invention with following accompanying drawings.

DETAILED DESCRIPTION OF THE INVENTION

The present invention resolves the problems in the following way. In the concentrated control device, that is a master section of the synchronous control for a plurality of electric motors, a phase detector of which input frequency is proportional to a setting rotational frequency, and rotation phase signals detected in the phase detector are always sent to the slave section.

The slave section receives said phase signals sent from the master section, and at any time detects simultaneously both master rotational frequency setting signals and master phase setting signals at the same time out of the sent common phase signals.

On the other hand, the slave section obtains rotational frequency feedback signals and phase feedback signals at the same time by perpetual detecting simultaneously both the rotational frequency feedback signals and phase feedback signals out of signals of a rotary encoder attached to the electric motor or a rotary encoder connected to a machine axis driven by the electric motor. Moreover, the slave section always calculates phase deviation between said master phase setting signals and said phase feedback signals.

Further the synchronous control of the electric motors is implemented based on the phase deviation, said master rotational frequency setting signals and said rotational frequency feedback signals.

As mentioned above, the slave section of the synchronous control device can obtain both the rotational frequency setting signals and the phase setting signals, based on the common rotation phase at the same time sent from the master section, so that a very highly accurate high synchronous control is realized.

In the above mentioned expression, the rotation phase signal is sent from the concentration control device, the master section, but it is also capable of using frequency signals sent from the rotary encoder, and using frequency outputting signals from the rotary encoder attached to the electric motor set in the master section or the rotary encoder connected to the machine axis driven by the electric motor.

Figure 2:
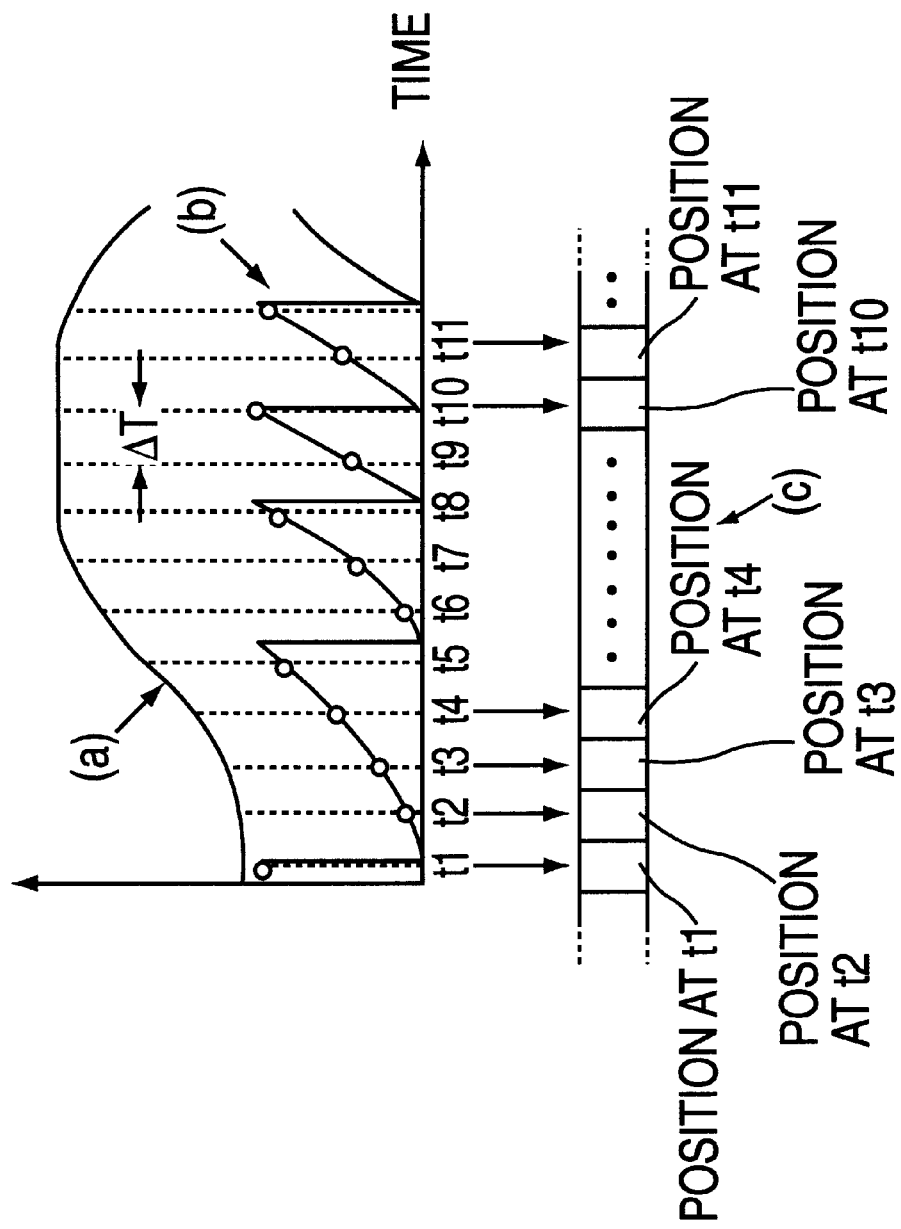
FIG. 2 shows a drawing explaining an action of the embodiment of the present invention.
Figure 3:
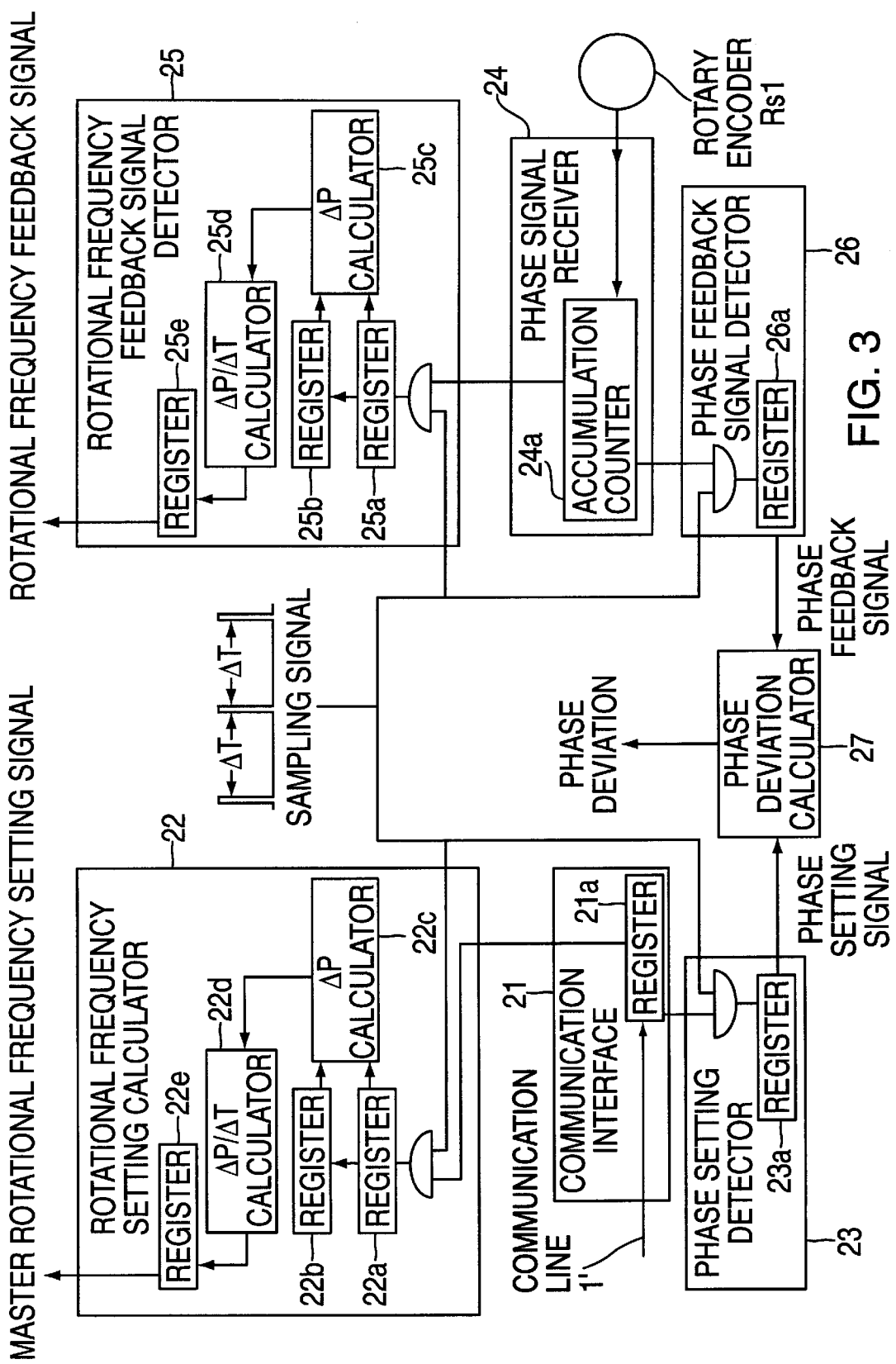
FIG. 3 shows an example of components of a rotational frequency setting calculator etc of the first embodiment.

In the following, the present invention is explained by referencing drawings. FIG. 1, FIGS. 4a and 4b, FIG. 5 and FIG. 6 are drawings showing components of the embodiment of synchronous control device, FIG. 2 shows a process of the master section, FIG. 3 shows an embodiment of concrete components of FIG. 1.

Figure 1:
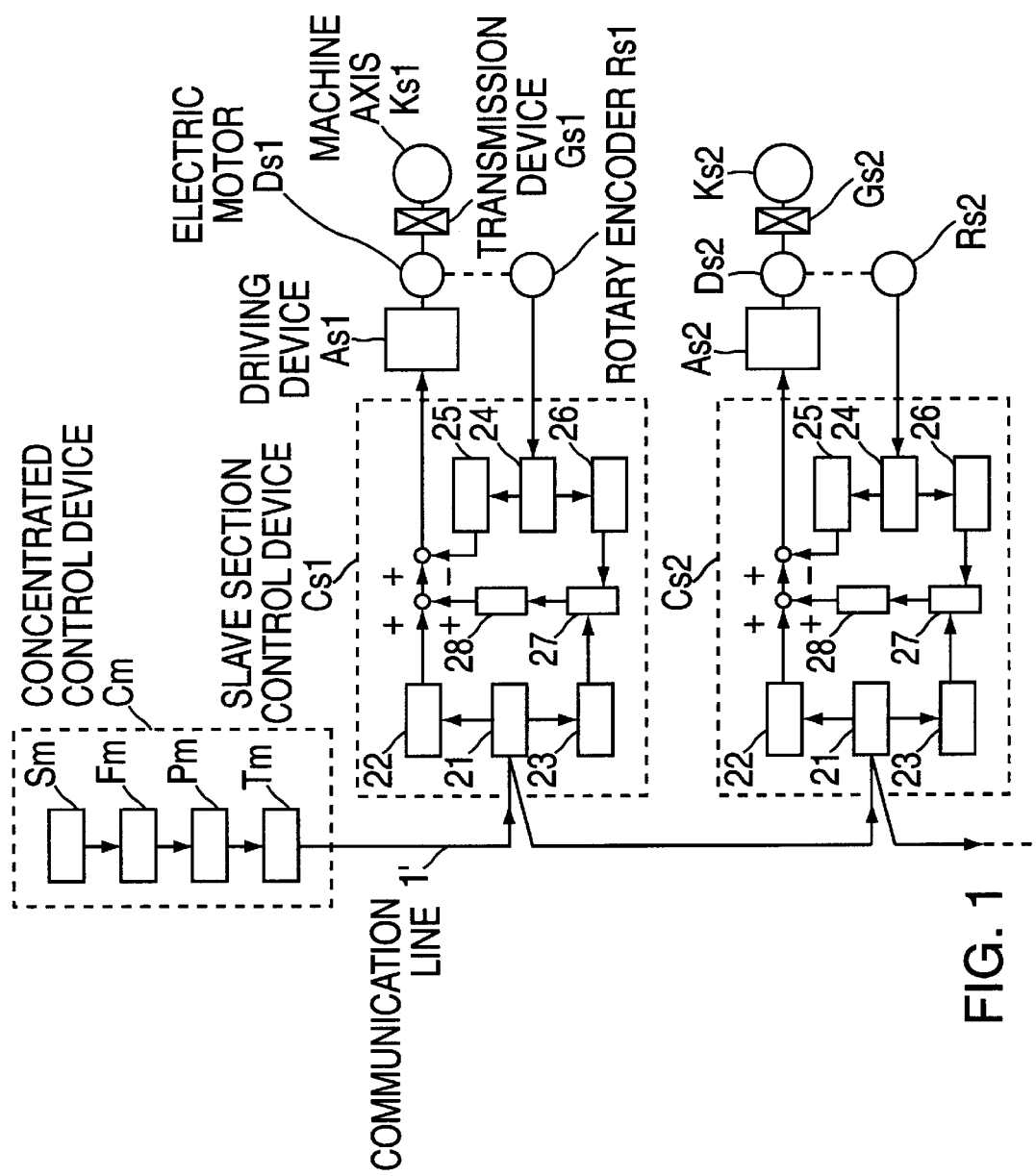
FIG. 1 shows a first embodiment.
Figure 5:
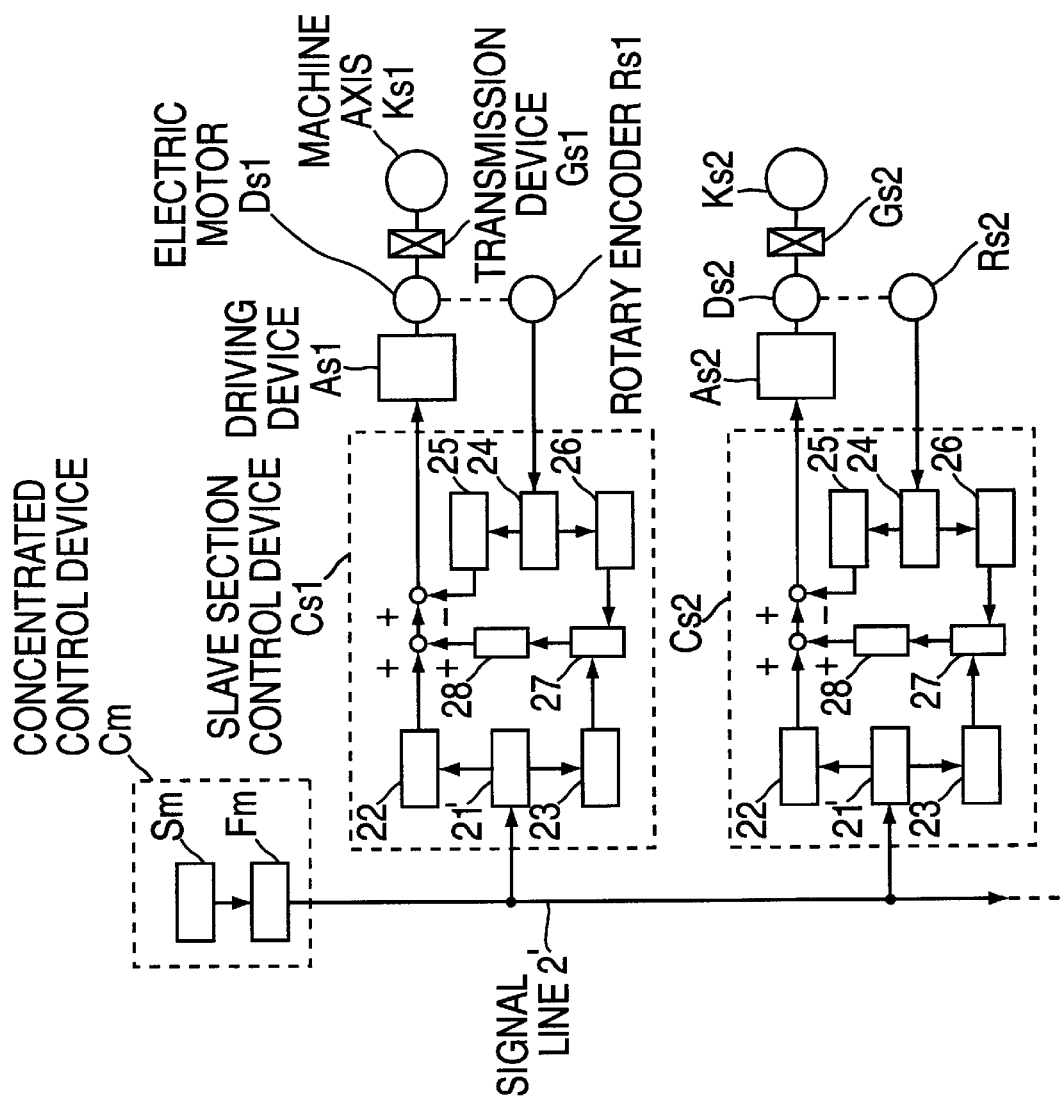
FIG. 5 shows a second embodiment.
Figure 6:
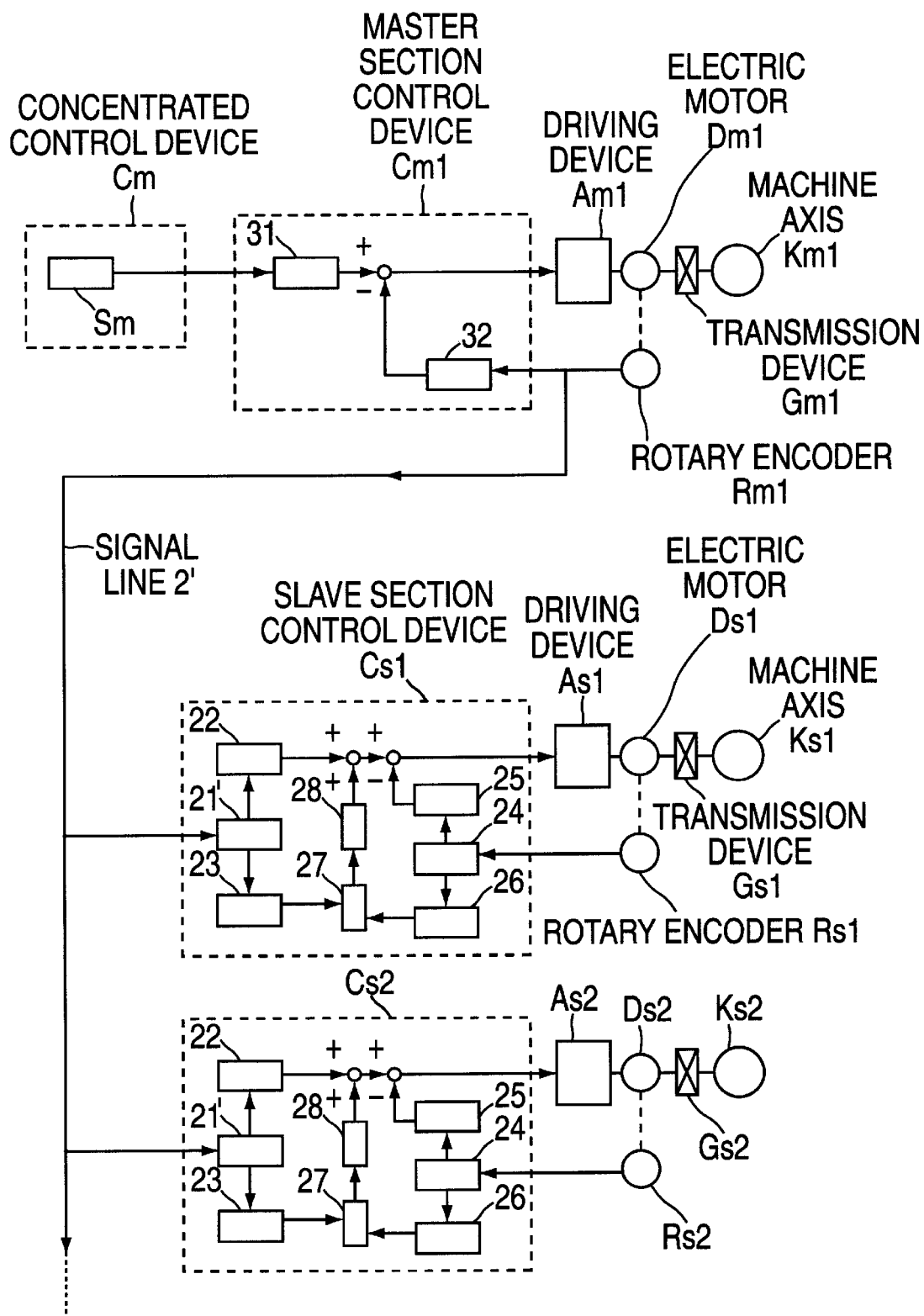
FIG. 6 shows a third embodiment.
Figure 7:
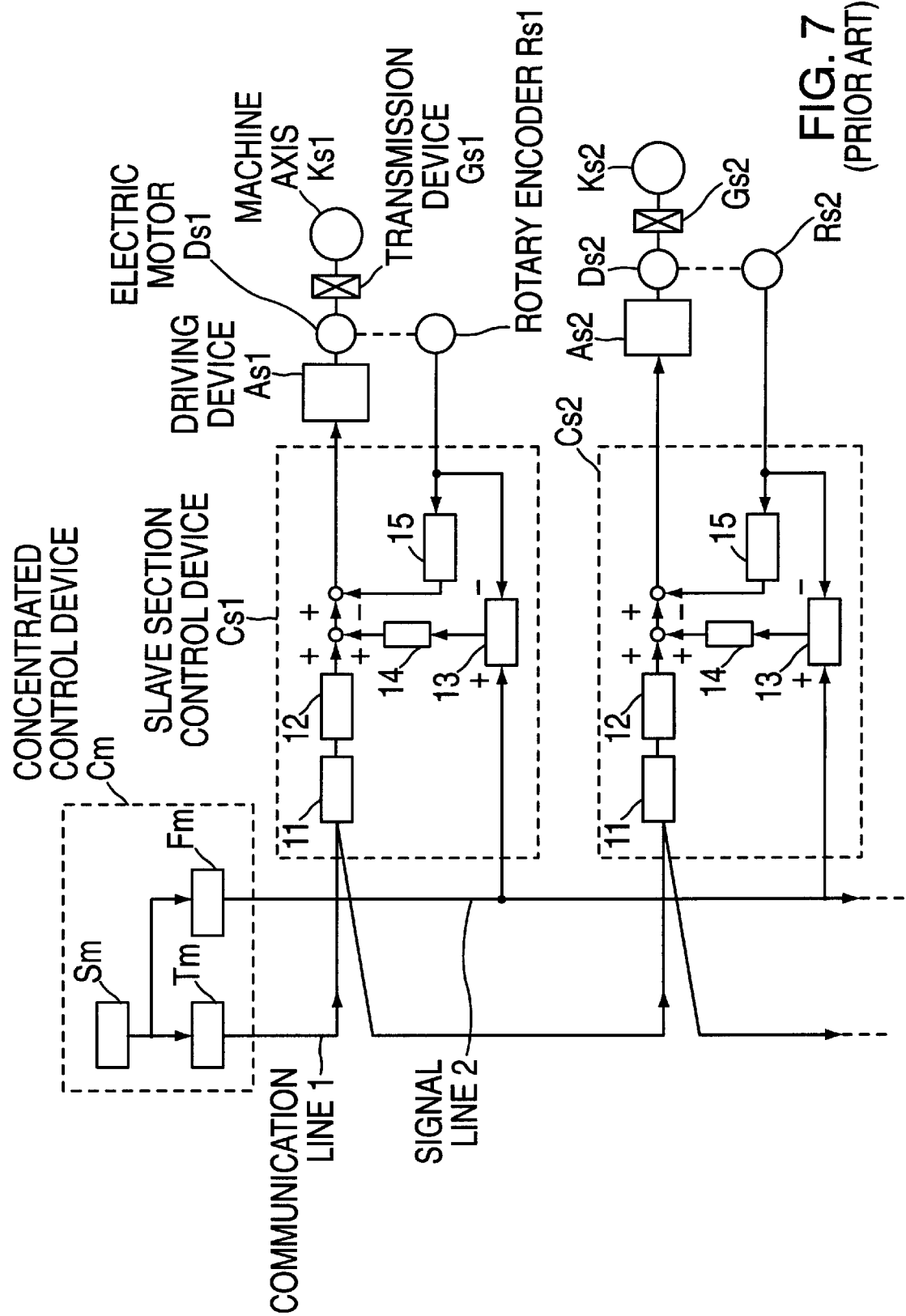
FIG. 7 shows an example of a prior art.
Figure 8:
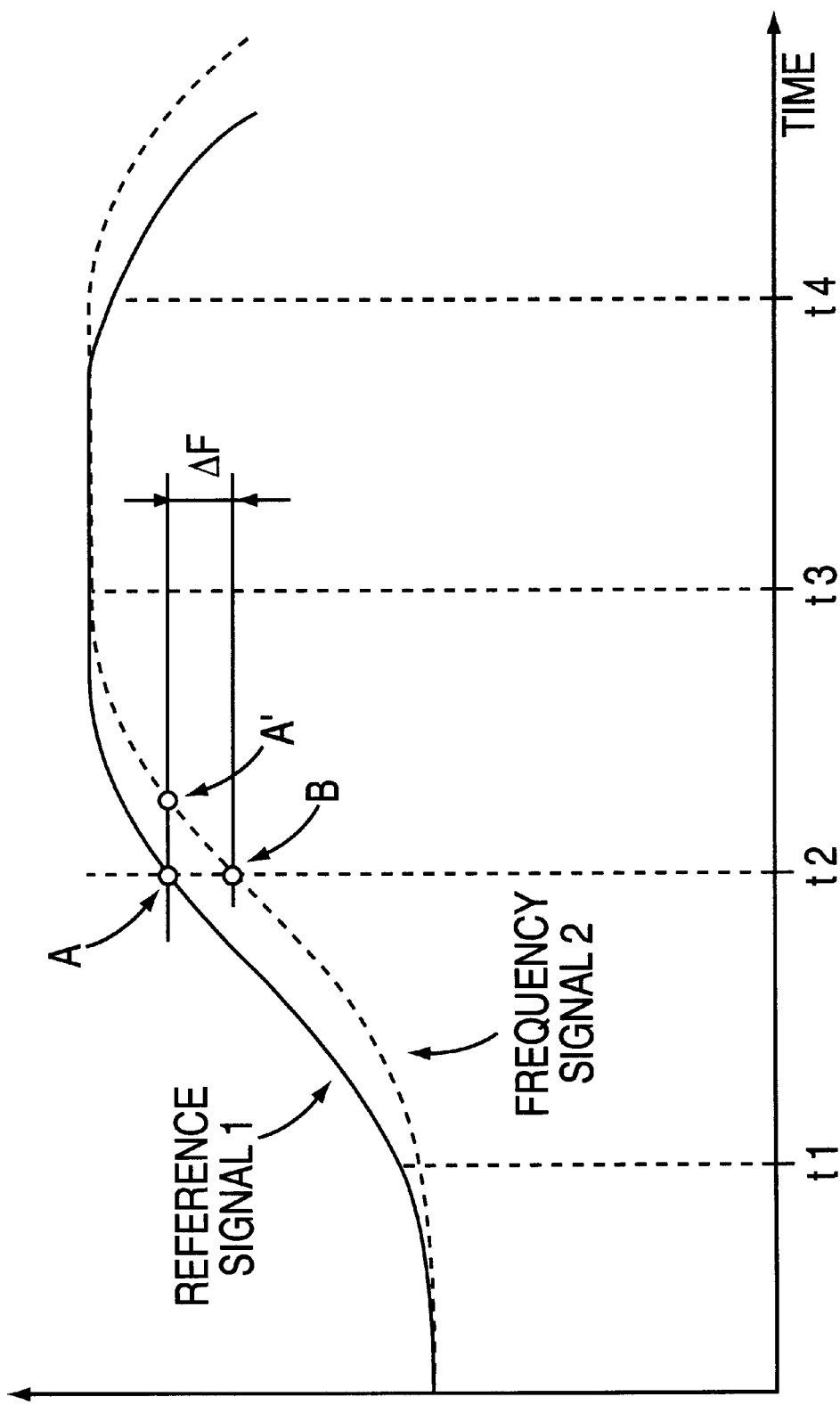
FIG. 8 shows a drawing explaining, time lag of the rotational frequency setting and the phase setting in prior art example.

Further, FIG. 1, FIG. 5 and FIG. 6 show the synchronous control of plural electric motors of the present invention, which has a master section and two slave sections as an example for making the explanation simple, and same parts in FIG. 7 showing the conventional art have same reference numbers.

In FIG. 1, Cm is a concentrated control device that is a master section, Cs1, Cs2 are the slave control devices, As1 and As2 are driving devices of electric motors of the slave section, Ds1, Ds2 are electric motors of the slave section, Rs1, Rs2 are encoders of an absolute system added to the electric motors or an inclement system having Z phase. Further Gs1, Gs2 are transmission devices, Ks1, Ks2 are machine axes rotated through Gs1, Gs2 by the electric motors Ds1, Ds2.

Now, in the embodiment in FIG. 1, a case which the rotary encoder is attached to the electric motor is explained, but the rotary encoder is capable of being connected to the machine axis connected to the electric motor through a transmission device.

Next, the concentrated control device Cm of the master section in FIG. 1 is explained.

In the concentrated control device Cm, Sm is a rotational frequency setting device, the output is sent to the frequency generator Fm. The frequency generator Fm generates signals proportional to the rotational frequency setting input and further the frequency signal is input into a phase detector Pm.

The phase detector Pm has an accumulating function and it is overflowed and cleared, when counting pulse number corresponding to one rotation of the rotary encoder in the slave section. The count value of the accumulating counter is sampled at a predetermined time distance $\Delta T$, and the phase detector Pm outputs signals corresponding to the phase signals. These phase signals are sent to the slave section control device Cs1 through the communication line 1 by the communication interface Tm.

In FIG. 2, the rotational frequency setting device Sm, the frequency generator Fm, the phase detector Pm and communication interface Tm are explained further.

The frequency generator Fm generates the frequency signals proportional to the rotational frequency setting value by the instruction of the rotational frequency setting device Sm, and the output frequency changes as (a) in FIG. 2.

The signals which the frequency generator Fm generates are counted in the accumulated counter in the phase detector Pm, and the count value of the accumulated counter changes as (b) in FIG. 2.

The accumulated counter of the phase detector Pm accumulates the pulse output from the frequency generator Fm, and it is overflowed and cleared when counting pulse number corresponding to the one rotation of the rotary encoder in the slave section, so that the count value is corresponding to a rotation phase.

The communication interface Tm takes sampling of the count value of the accumulated counter of the phase detector at timing (at the time of the black point of (b) in FIG. 2) of time t1,t2, . . . (time interval ΔT) and transform the counted value of the accumulation counter of the phase detector Pm shown in (c) in FIG. 2 to the serial signal, and send them to all slave sections periodically and at high rotational frequency. Now, the sending frequency (=ΔT) of the phase signal by the communication interface Tm is short practically less than 0.2 msec, for example when the rotation number of the above mentioned rotary encoder is 2400 rpm, one rotation time is 25 ms, so that the phase signal number of 125 are sent by one rotation (in FIG. 2, for simplifying the explanation, the rotation number of the phase signal by one rotation is abbreviated to 3).

Next, the slave section control devices Cs1, Cs2 in FIG. 1 are explained. In the slave section control devices Cs1, Cs2, 21 is a communication interface, 22 is a rotational frequency setting calculator, and 23 is phase setting detector. Further 24 is a phase signal receiver receiving the phase signal from the rotary encoder Rs1, Rs2, 25 is a rotational frequency feedback signal detector, 26 is a phase feedback signal detector, 27 is a phase deviation calculator and 28 is a PI amplifier.

The communication interface 21 of FIG. 1 receives the serial signal sent from the communication interface Tm of the said master section at given timing, and restores the master phase signals shown as (c) in FIG. 2. Further the rotational frequency setting calculator 22 calculates the master rotational frequency setting signal from the phase setting signal output from the communication interface 21. The phase setting detector 23 stores the phase setting signals and overflows numbers (explained later) output from the communication interface 21.

Figure 4A:
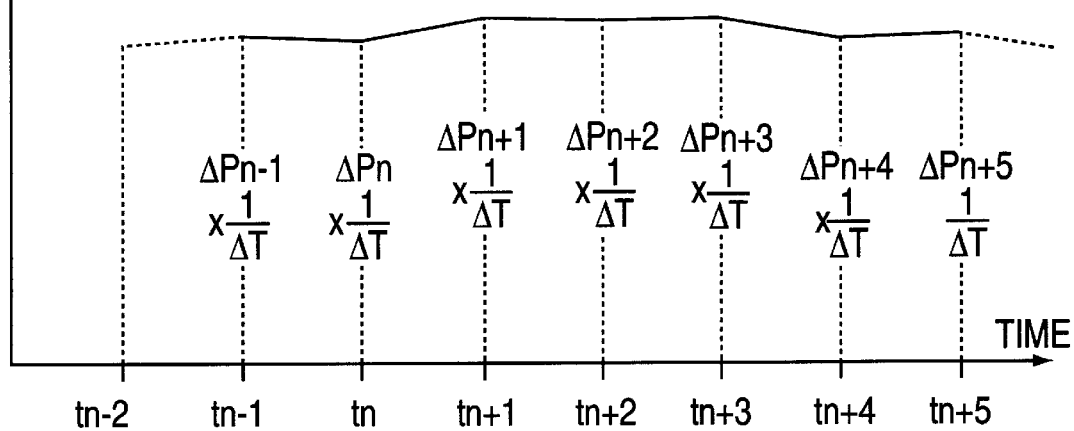
FIGS. 4a and 4b show drawings explaining the action of the rotational frequency setting calculator of the first embodiment.
Figure 4B:
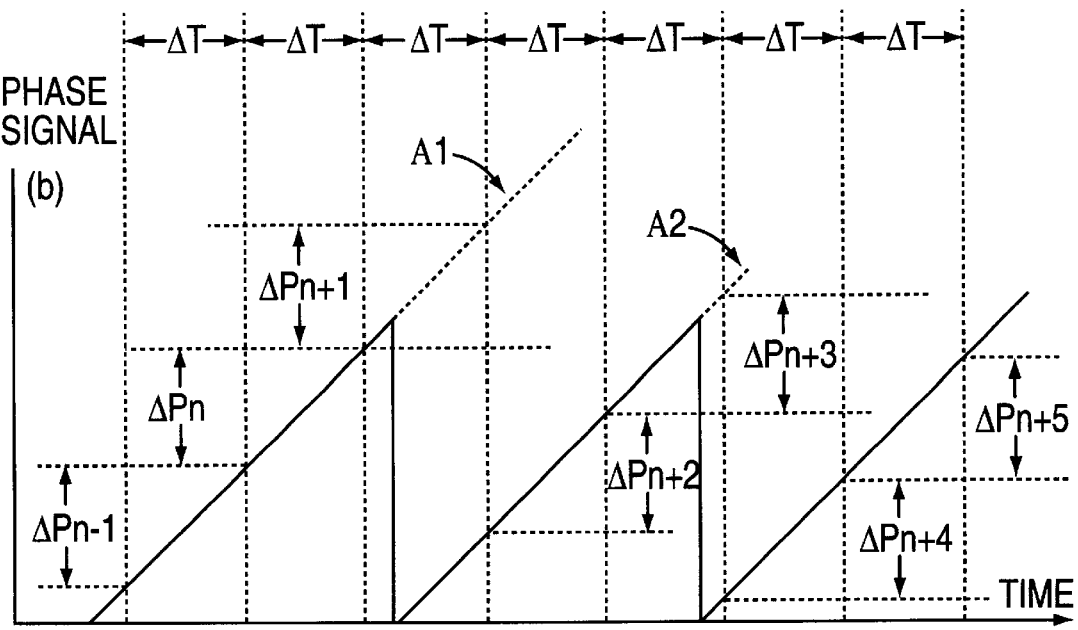

FIG. 3 shows the details of the communication interface 21, the rotational frequency setting calculator 22, the phase setting detector 23, the phase signal receiver 24, the rotational frequency feedback signal detector 25, the phase feedback signal detector 26 in the FIG. 1, and FIGS. 4a and 4b calculation action of the master rotational frequency setting signal by the rotational frequency setting calculator 22.

Next, the action of the rotational frequency setting calculator 22 and phase setting detector 23 are explained by the FIG. 3 and FIGS. 4a and 4b.

As shown in FIG. 3, the communication interface 21 provides a register 21a, and transforms the serial signals corresponding to the master phase setting signals sent through the communication line 1' to the parallel signals and stores in the register 21a.

The master phase setting signals stored in the register 21a (in the following, it is abbreviated as phase setting signals in necessary occasions) are taken sampling at an interval of time ΔT, and stored in each of the register 22a of the rotational frequency setting calculator 22 and the register 23a of the phase setting detector 23. Now, it is preferable that the time interval ΔT is same with the time interval ΔT of the concentrated control device Cm, but, the synchronization to the sampling time of the concentrated control device Cm is not always necessary Next, the calculation of the rotational frequency setting signal of the rotational frequency setting calculator 22 is explained by using FIGS. 4a and 4b. FIG. 4a shows the master rotational frequency setting signal calculated by the rotational frequency setting calculator 22, and FIG. 4b shows the phase setting signal received by the communication interface 21.

As mentioned above, the phase setting signal sent from the concentrated control device Cm is the count value of the accumulation counter set in the phase detector Pm of the concentrated control device Cm, and the count value of the accumulation counter is accumulated frequency signals proportional to the rotational frequency setting value. Therefore, the variation of the count value of the accumulated counter, that is, the variation of the phase setting signal indicates signals corresponding to the rotational frequency signal. Now, the accumulation counter is cleared when counting the pulses corresponding to one rotation of the rotary encoder of the slave section, so that, when the count value of the accumulation counter, that is the phase setting signal sent from the concentrated control device Cm, is smaller than that of the last time, the accumulated counter is overflowed and cleared.

As mentioned above, obtaining variation ΔPk (k=1−m) of the phase setting signal and dividing by the ΔT of sampling interval shown in FIG. 4b, the rotational frequency setting signal shown in FIG. 4a is obtained. Now, when the phase setting signal is less than that of the last time, the accumulated counter of the concentrated control device Cm is cleared (in the time that the accumulated counter is overflowed), so that, in this case, the above mentioned variation ΔPn+1, ΔPn+3 are obtained by obtaining the phase setting signal after ΔT on a line which is extended decline of the phase setting signal shown by dotted lines A1, A2 in FIGS. 4a and 4b.

Based on the above-mentioned principle, the rotational frequency setting calculator 22 calculates the rotational frequency setting signals as in the following.

The phase setting signal through communication line 1' is registered in the register 22a of the rotational frequency setting calculator 22 each ΔT time. When the next phase signal is stored in the register 22a in ΔT time, the phase setting signal registered in the register 22a is transmitted to the register 22b, and the newly input phase setting signal is registered in the register 22a. As the result, the phase setting signal sampled in this time is kept in the register 22a, and the phase setting signal sampled the last time is kept in the register 22b.

ΔP calculator 22c obtains the variation ΔP from the phase setting signals which are kept in the registers 22a, 22b and sends it to the ΔP/ΔT calculator 22d. The ΔP/ΔT calculator 22d obtains the rotational frequency setting signal by dividing the variation ΔP by the time interval ΔT. The calculated rotational frequency setting signal is kept in the register 22e.

As mentioned above, the rotational frequency setting calculator 22 obtains a master rotational frequency setting signal based on one phase signal obtained from the communication interface 21.

Further the phase setting detector 23 keeps the phase setting signals and stores times that the phase setting signal is less than that of the last time, that is the overflow times. Like this, the rotational frequency setting calculator 22 and the phase setting detector 23 obtain simultaneously the master rotational frequency setting signals and the master phase setting signals based on the phase setting signal sent from the concentrated control device Cm.

On the other hand, the phase signal receiver 24 of the slave section Cs1, Cs2 receives signals from the rotary encoder Rs1, Rs2. The phase feedback signal detector 26 detects the phase signals shown as (b) in FIG. 2, which are feedbacked from the electric motor. The rotational frequency feedback signal detector 25 calculates the rotational frequency feedback signals from the electric motor Ds1, Da2.

As shown in FIG. 3, the rotational frequency feedback signal detector 25 and the phase feedback signal detector 26 comprise the same components with the mentioned rotational frequency setting calculator 22 and the phase setting detector 23, and the phase receiver 24 comprises the counter 24a for counting pulse signals sent from the rotary encoder Rs1.

The above mentioned accumulating counter 24a counts the pulse signals sent from the rotary encoder Rs1, and when counting the pulses corresponding to the one rotation of the rotary encoder, it is overflowed and cleared. Because of this, the count value shows the rotation phase of the rotary encoder Rs1.

The count value of the accumulated counter 24a is taken sampling by the sampling signal of the fore mentioned time interval ΔT, and stored in the register 25a of the rotational frequency feedback signal detector 25 and the register 26a of the phase feedback signal detector 26.

The rotational frequency feedback signal detector 25 works same with the rotational frequency setting calculator 22, and calculates the rotational frequency feedback signals based on the rotation phase signals registered in the register 25a.

Further, signals corresponding to the rotation phase of the rotary encoder Rs1 is stored in the register 26a in the phase feedback signal detector 26, and the overflow number of the accumulation counter 24a is stored in the phase feedback signal detector 26.

The phase deviation calculator 27 calculates the master phase setting signals and the phase deviation of the rotary encoder Rs1 based on the master phase setting signal output from the phase setting detector 23, the phase feedback signal output from the phase feedback signal detector 26 and the overflow number stored in the phase setting detector 23 and the phase feedback signal detector 26.

The phase deviation calculator 27 obtains the phase deviation Hs by a following equation (1) (the details of which are in U.S. application Ser. No. 09/464,890, filed Dec. 16, 1999, which is incorporated herein by reference).

$$Hs = Nmax \times Covf + Cm - Cs \qquad (1)$$

Now, Nmax is pulse numbers by one rotation of the rotary encoder Rs1 (overflow pulse numbers of accumulation counter in the concentrated control device Cm and accumulation counter 24a), Covf is the difference of the overflow time of accumulation counter in the concentrated control device Cm and the accumulated counter 24a (1 increment by an overflow of the accumulation counter in the concentrated control device Cm and 1 subtract by an over flow of the accumulation counter 24a), Cm is a value kept in the register 23a of the phase setting detector 23, and Cs is a value kept in the register 26a of the phase feedback signal detector 26.

This phase deviation is added to the master rotational frequency setting signal output from the rotational frequency setting calculator 22 as the phase correction signal through the PI amplifier 28 shown in FIG. 1, and sent to the driving devices As1, As2 to control the electric motors Ds1, Ds2.

That is, as mentioned above, the master rotational frequency setting signal is corrected based on the output of the phase deviation counter 27, the rotational frequency and the phase of the electric motors Ds1, Ds2 of the slave section control device of Cs1, Cs2 are controlled by the deviation between the corrected rotational frequency setting signal and rotational frequency feedback signal.

As mentioned above, this invention obtains the master rotational frequency setting signal and the master phase setting signal based on one phase signal, so that the master rotational frequency setting signal and the master phase setting signal can be obtained without the time delay, and a highly accurate synchronous control is capable.

Now, the concentrated control device Cm of the master section and the slave section control device Cs1, Cs2 in FIG. 1 and FIGS. 4a and 4b are composed of microprocessor, digital signal processor, gate array etc., so that it is needless to say that it can be processed with very high rotational frequency.

Further in the above mentioned embodiment, a case that the rotation direction of all electric motors in the slave section is supposed to be same, but, even if there are electric motors of an inverse rotation direction, they can be implemented synchronous control the connection of the rotary encoder and the accumulation counter 24a, in the same manner that the rotation direction of all electric motors is same.

Next the second embodiment shown in FIG. 5 is explained.

In FIG. 5, parts having same function with those in FIG. 1 have same symbols and the explanation is neglected.

The present embodiment is that which the concentrated control device Cm sends the frequency signals of frequency proportional to the rotational frequency setting signals output from the frequency generator Fm to directly the slave section control device Cs1, Cs2 through signal line 2', and in the slave section control device Cs1, Cs2 the master rotational frequency setting signal and the master phase setting signal are obtained. Now, the frequency signals are pulse signals like output signals of an absolute encoder or an incremental encoder having Z phase.

The components of the rotational frequency setting calculator 22, the phase setting detector 23 in the present embodiment are same with those of in FIG. 3, but the phase setting receiver 21' having an accumulation counter instead of the register, and the accumulation counter counts abovementioned frequency signals sent from the concentrated control device Cm. Further the count value of the accumulation counter is taken sampling by the sampling signals of the time interval ΔT, and the sampling data are registered in the register 22a of the rotational frequency setting calculator 22 and the register 23a of the phase setting detector 23. Action after this is same with the first embodiment, and the master rotational frequency setting signal is calculated by the rotational frequency setting calculator 23 like the explanation in FIG. 3, further, the phase setting signal is detected by the phase setting detector 23 at the same time with this.

Further the components of the phase signal receiver 24, the rotational frequency feedback signal detector 25 and the phase feedback signal detector 26 are same with those of FIGS. 4a and 4b, the synchronous control is implemented the same with the first embodiment.

Also, in this embodiment, as the master rotational frequency setting signal and the master phase setting signal is obtained also based on one frequency signal, the master rotational frequency setting signal and the master phase setting signal is obtained without delay time, same as the first embodiment, so that the highly accurate synchronous control is realized.

FIG. 6 shows the third embodiment of the present invention, and the present embodiment is that which, using a usual electric motor controlled by usual rotational frequency control as the master section, and send signals of a rotary encoder attached to the electric motor to the slave section.

In FIG. 6, Cm1 is a control device of the master section, Am1 is a driving device of the electric motor of the master section, Dm1 is an electric motor of the master section, Rm1 is a rotary encoder, which is attached to the electric motor, with an absolute system or an incremental system having Z-phase. Further Gm1 is a transmission device, Km1 is a rotating machine axis driven through the Gm1 by the electric motor Dm1.

Also, in the control device Cm1 of the master section, 31 is rotational frequency setting detector, 32 is rotational frequency feedback signal detector.

The master section is driven by the usual rotational frequency control, and the output (the same pulse output with the second example of the frequency generator Fm in the second embodiment) of the rotary encoder Rm1 of the master section is sent to the slave section through the signal line 2'.

In the slave section control device Cs1, Cs2, the phase setting receiver 21' having an accumulated counter, like explained in the second embodiment, receives the output of the rotary encoder Rm1. Further, like the second embodiment, the rotational frequency setting calculator 22 and the phase setting detector 23 detect simultaneously the master rotational frequency setting signals and the master phase setting signals, and control the synchronous control in the manner as the first example shown in FIG. 1.

In this embodiment, as the master rotational frequency setting signal and the master phase signals are obtained from the rotary encoder Rml of the master section, the master rotational frequency setting signals and the master phase setting signals are obtained without time lag like the first embodiment and the second embodiment, so that the highly accurate synchronous control is realized.

As mentioned above, in the present invention, the rotational frequency setting and phase setting of the electric motor are simultaneously detected from one of the phase setting signal or frequency signal of the master section, and the synchronous control is implemented based on this, so that highly accurate setting of rotational frequency setting and phase setting without time lag is capable, and the very high highly accurate synchronous control is realized.

Although the invention has been described in its preferred form with a certain degree of particularity, it is understood that the present disclosure of the preferred form has been changed in the details of components without departing from the spirit and the scope in the appended claims.

What is claimed is:

1. A synchronous control device synchronizing accurately rotational frequency and rotation phase of an electric motor or a machine axis driven by the electric motor comprising:
   in a master section, a frequency generator of which input is a rotational frequency reference, and a phase detector of which input is output of the frequency generator, and a means for outputting phase signals obtained from the phase detector to a slave section; in a slave section, further comprising:
      a detecting means for detecting simultaneously perpetually both of master rotational frequency setting signals and master phase setting signals by using said phase signals sent from the master section;
      a means for detecting simultaneously perpetually rotational frequency feedback signals and phase feedback signals based on output of a rotary encoder attached to an electric motor of the slave section or a rotary encoder connected to an machine axis driven by the electric motor;
      a phase deviation detecting means for detecting perpetually phase deviation out of said master phase setting signals and said phase feedback signals;
      implementing the synchronous control of the electric motor of the slave section or the machine axis driven thereby, based on the phase deviation detected by the phase deviation detecting means, said master rotational frequency setting signals and said rotational frequency feedback signals.

2. A synchronous control device synchronizing accurately rotational frequency and rotation phase of an electric motor or a machine axis driven by the electric motor comprising:
   in a master section, a frequency generator of which input is a rotational frequency reference and a means for outputting frequency signals obtained from the frequency generator to a slave section;
   in a slave section, further comprising:
      a detecting means for detecting simultaneously perpetually both of master rotational frequency setting signals and master phase setting signals by said frequency signals sent from the master section;
      a means for detecting simultaneously perpetually rotational frequency feedback signals and phase feedback signals based on output of a rotary encoder attached to an electric motor of the slave section or a rotary encoder connected to an machine axis driven by the electric motor;
      a phase deviation detecting means for detecting perpetually phase deviation out of said master phase setting signals said phase feedback signals;
      implementing the synchronous control of the electric motor of the slave section or the machine axis driven thereby, based on the phase deviation detected by the phase deviation detecting means, said master rotational frequency setting signals and said rotational frequency feedback signals.

3. A synchronous control device synchronizing accurately rotational frequency and rotation phase of an electric motor or a machine axis driven by the electric motor comprising:
   in a master section, a control device for controlling the electric motor, and a means for sending frequency signals outputted from a rotary encoder attached to the electric motor or a rotary encoder connected to an machine axis driven by the electric motor to the slave section;
   in a slave section, further comprising:
      a detecting means for detecting simultaneously perpetually both of master rotational frequency setting signals and master phase setting signals by said frequency signals sent from the master section;
      a means for detecting simultaneously perpetually rotational frequency feedback signals and phase feedback signals based on output of a rotary encoder attached to an electric motor of the slave section or a rotary encoder connected to an machine axis driven by the electric motor;
      a phase deviation detecting means for detecting perpetually phase deviation out of said master phase setting signals and said phase feedback signals;
      implementing the synchronous control of the electric motor of the slave section or the machine axis driven thereby, based on the phase deviation detected by the phase deviation detecting means, said master rotational frequency setting signals and said rotational frequency feedback signals.

* * * * *